United States Patent
Chin et al.

(10) Patent No.: US 7,845,556 B2
(45) Date of Patent: Dec. 7, 2010

(54) OPTICAL ENCODER WITH CONTAMINATION DETECTION

(75) Inventors: Yee Loong Chin, Perak (MY); Jiin Cheang Cheong, Penang (MY)

(73) Assignee: Avago Technologies ECBU IP (Singapore) Pte. Ltd., Singapore (SG)

(*) Notice: Subject to any disclaimer, the term of this patent is extended or adjusted under 35 U.S.C. 154(b) by 964 days.

(21) Appl. No.: 11/287,966

(22) Filed: Nov. 28, 2005

(65) Prior Publication Data

US 2007/0119933 A1 May 31, 2007

(51) Int. Cl.
*G06K 7/14* (2006.01)
*G01N 21/896* (2006.01)

(52) U.S. Cl. ............ 235/454; 250/201.1; 250/205; 250/559.41

(58) Field of Classification Search .......... 235/454, 235/455; 250/200–215
See application file for complete search history.

(56) References Cited

U.S. PATENT DOCUMENTS

| | | | | |
|---|---|---|---|---|
| 4,093,961 A | * | 6/1978 | Kanamaru | 369/53.28 |
| 4,334,301 A | * | 6/1982 | Kanamaru | 369/116 |
| 4,712,000 A | * | 12/1987 | Yoshikawa et al. | 250/205 |
| 4,713,964 A | * | 12/1987 | Ioannides | 73/114.71 |
| 4,996,786 A | * | 3/1991 | Shoenfeld | 40/361 |
| 5,015,836 A | * | 5/1991 | Van Antwerp | 250/205 |
| 5,132,527 A | * | 7/1992 | Karpati | 250/205 |
| 5,302,944 A | * | 4/1994 | Curtis | 340/653 |
| 5,406,267 A | * | 4/1995 | Curtis | 340/653 |
| 5,446,272 A | * | 8/1995 | Barkan | 235/454 |
| 5,693,931 A | * | 12/1997 | Wade | 250/205 |
| 5,694,208 A | * | 12/1997 | Ichikawa | 356/73 |
| 6,107,620 A | * | 8/2000 | Shiba et al. | 250/214 R |
| 6,119,938 A | * | 9/2000 | Agabra et al. | 235/454 |
| 6,653,620 B2 | * | 11/2003 | Blasing et al. | 250/231.13 |
| 6,734,948 B2 | * | 5/2004 | Futakami et al. | 355/32 |
| 7,291,831 B2 | * | 11/2007 | Rajaiah et al. | 250/231.13 |
| 2005/0127305 A1 | * | 6/2005 | Androsyuk et al. | 250/461.1 |
| 2005/0199777 A1 | * | 9/2005 | Rajaiah et al. | 250/200 |
| 2006/0192008 A1 | * | 8/2006 | Wong et al. | 235/454 |

* cited by examiner

*Primary Examiner*—Thien M. Le
*Assistant Examiner*—Christle I Marshall (57) ABSTRACT

An optical unit includes an optical emitter receiving an optical emitter current, an optical sensor receiving an optical sensor current and light from the optical emitter and in response thereto outputting at least one signal indicating relative movement between the optical unit and an optical code scale, and an optical sensor current detector comparing the optical sensor current to a reference value. In response to the optical sensor current being different than the reference value, the optical sensor current detector outputs an optical sensor current detector signal. The optical sensor current detector signal indicates the presence of a contaminant in a light path from the optical emitter to the optical sensor, and is used to regulate the current to the optical emitter so as to counteract the negative effects of the contaminant in the light path.

20 Claims, 6 Drawing Sheets

OPTICAL ENCODER WITH CONTAMINATION DETECTION

BACKGROUND

Optical encoders are used in a wide variety of contexts to determine movement and/or a position of an object with respect to some reference. Optical encoding is often used in mechanical systems as an inexpensive and reliable way to measure and track motion among moving components. For instance, printers, scanners, photocopiers, fax machines, plotters, and other imaging systems often use optical encoding to track the movement of an image media, such as paper, as an image is printed on the media or an image is scanned from the media.

One common technique for optical encoding uses an optical sensor and an encoder code scale (or encoding media). The optical sensor focuses on a surface of the code scale. As the sensor moves with respect to the code scale (or encoding media), or the code scale moves with respect to the sensor, the sensor reads a pattern of light either transmitted through, or reflected by, the code scale to detect the motion.

A typical code scale is an alternating series of features. As the encoder and sensor move relative to the one another, transitions from one feature to the next in the pattern are optically detected. For instance, a code scale could be an alternating pattern of holes, or optically transmissive windows, in an opaque material. In which case, an optical sensor can detect transitions from darkness to light passing through the holes or windows.

Figure 1:
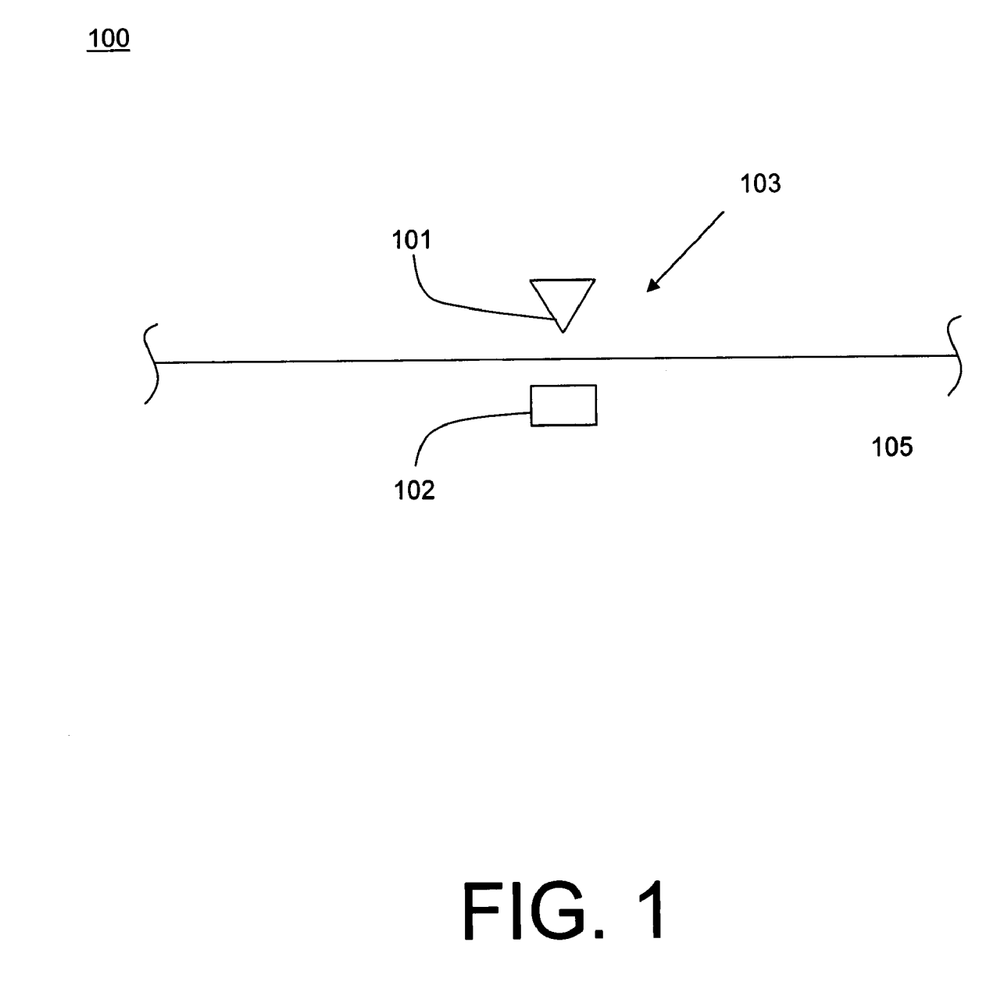
FIG. 1 shows a basic optical encoder.
Figure 2:
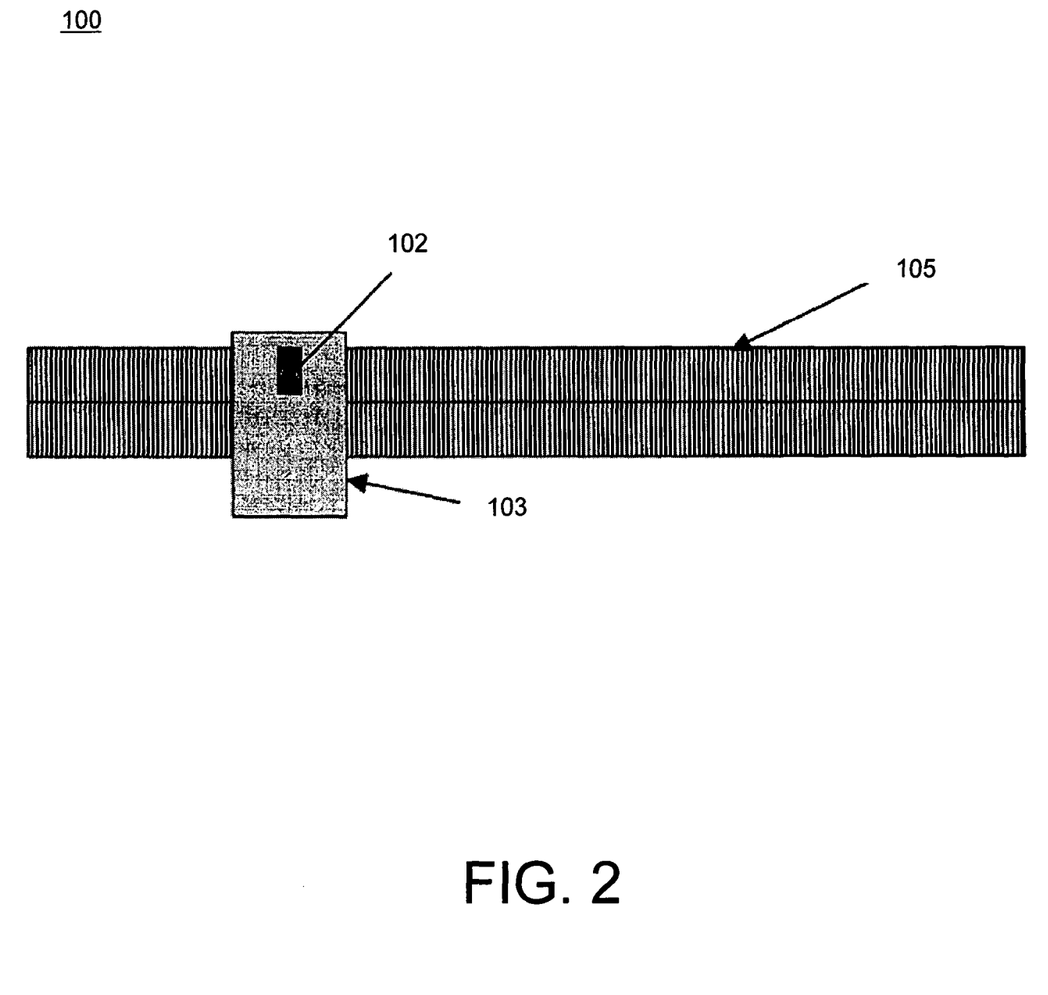
FIG. 2 is another view of the basic optical encoder of FIG. 1.

FIG. 1 illustrates a basic optical encoder 100 comprising an optical unit 103 including an optical emitter 101 and an optical sensor 102, and a light controlling member (optical code scale) 105 disposed between the optical emitter 101 and the optical sensor 102. Optical unit 103 and optical code scale 105 can move relative to each other in a linear fashion longitudinally of optical code scale 105. FIG. 2 is another view of optical encoder 100.

In one common application, optical unit 103 is mounted on the printing head of a printer, optical code scale 105 is fixed to a case of the printer, and optical unit 103 moves along the length of code scale 105 when the printing head moves. As optical unit 103 moves along the length of optical code scale 105, light from optical emitter 101 passing through optical code scale 105 is sensed by optical sensor 102 to produce one or more signals that indicate the relative movement between optical unit 103 and optical code scale 105. The output signal or signals from optical sensor 102 are then used by the printer to help control the movement of the printing head and/or paper in the printing process.

However, there are some problems that can occur to the optical sensor when the optical encoder is installed in a printer as described above. For example, ink aerosol is a problem which can shorten the lifetime of optical encoder 100. In particular, during the printing process ink particles can become airborne and then deposited on optical emitter 101, optical code scale 105, and/or optical sensor 102. When that happens, the light path from optical emitter 101, to code scale 105, and finally to optical sensor 102, is partially or completely blocked by the ink particle(s) so that optical encoder 100 does not operate properly. In that case, maintenance or replacement of all or part of the optical encoder 100 is required. Undesirably, maintenance or replacement of optical encoder 100 can be expensive and decreases the availability of the host device (e.g., printer).

What is needed, therefore, is an optical sensor capable of remedying a malfunction due to the deposition of one or more ink particles on an optical encoder, and an optical encoder including such an optical sensor.

SUMMARY

In an example embodiment, an optical encoder comprises: an optical code scale and an optical unit. The optical unit further comprises: an optical emitter receiving an optical emitter current and in response thereto providing light to the code scale; an optical sensor receiving an optical sensor current and the light from the code scale and in response thereto outputting at least one signal indicating relative movement between the optical sensor and the code scale; and an optical sensor current detector comparing the optical sensor current to a reference value, and in response to the optical sensor current being different from the reference value, outputting an optical sensor current detector signal for regulating the optical emitter current supplied to the optical emitter.

In another example embodiment, a method of operating an optical unit including an optical emitter and an optical sensor, comprises: supplying an optical emitter current to the optical emitter; supplying an optical sensor current to the optical sensor; comparing the optical sensor current to a reference value; and in response to the optical sensor current being different from the reference value, regulating the optical emitter current supplied to the optical emitter.

In yet another example embodiment, an optical unit comprises: an optical emitter receiving an optical emitter current; an optical sensor receiving an optical sensor current and light from the optical emitter and in response thereto outputting at least one signal indicating relative movement between the optical unit and an optical code scale; and an optical sensor current detector comparing the optical sensor current to a reference value, and in response to the optical sensor current being different from the reference value, outputting an optical sensor current detector signal indicating the presence of a contaminant in a light path from the optical emitter to the optical sensor.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 3A:
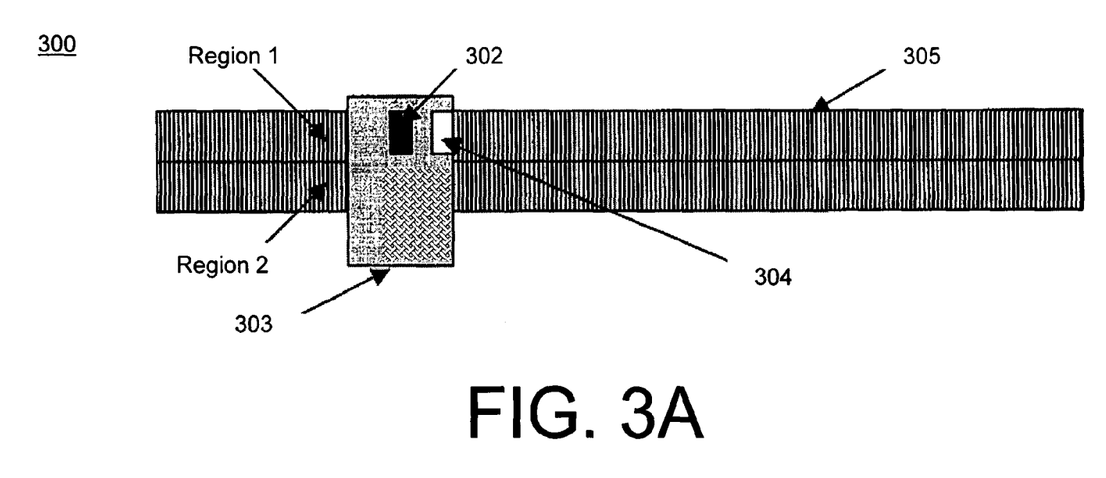
FIGS. 3A-B show two embodiments of an optical encoder including a monitoring optical sensor.

FIG. 3A shows one example embodiment of an optical encoder 300, comprising: an optical unit 303 including an optical emitter (not shown), optical sensor 302, and a monitoring light detector 304; and light controlling member (optical code scale) 305 disposed between the optical emitter and optical sensor 302. By monitoring the output signal of monitoring light detector 304, optical encoder 300 can sense the presence of a contaminant (e.g., ink particle) on optical code scale 305.

However, because monitoring light detector 304 has been moved in relationship to optical sensor 302, it cannot detect contaminants in real time and so it can only identify a malfunction, not provide a real-time correction of the problem. Furthermore, monitoring light detector 304 can only detect a contaminant on the optical code scale 305—it cannot detect any contaminant (e.g., ink particle) that might be present on the optical emitter or optical sensor 302.

Figure 3B:
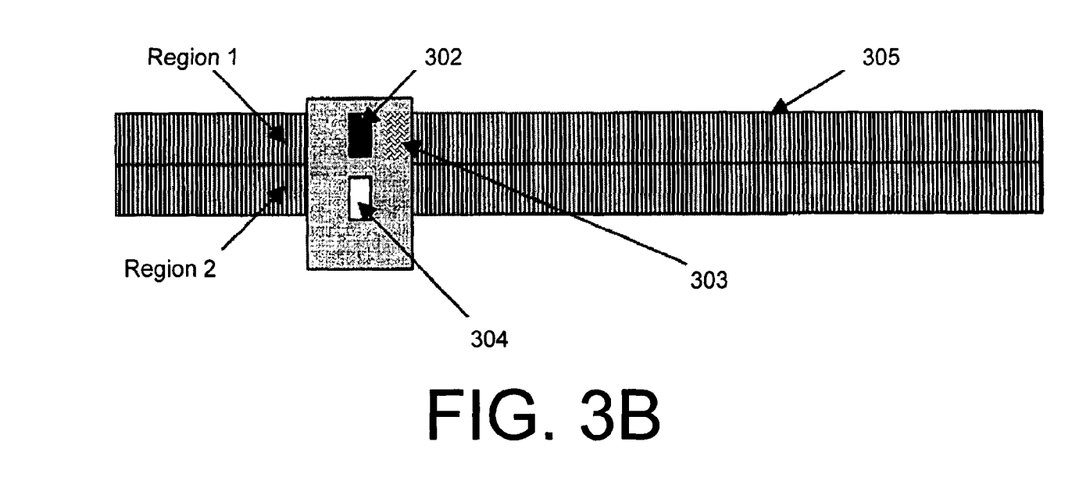

FIG. 3B shows another embodiment where monitoring light detector 304 has been moved in relationship to optical sensor 302. In the embodiment of FIG. 2, monitoring light detector 304 can detect some contaminants on optical code scale 305 in real-time as optical sensor 302 encounters them. However, in other cases the contaminant may be only present on Region 1 of optical code scale 305, so that it affects optical sensor 302, but is not detected by monitoring light detector 304. Furthermore, in other cases the contaminant may be only present on Region 2 of optical code scale 305, in which case monitoring light detector 304 may output a "false positive" signal indicating a problem that is not actually affecting the operation of optical encoder 300. And just like in the embodiment of FIG. 3A, monitoring light detector 304 cannot detect any contaminant (e.g., ink particle) that might be present on the optical emitter or optical sensor 302.

Figure 4:
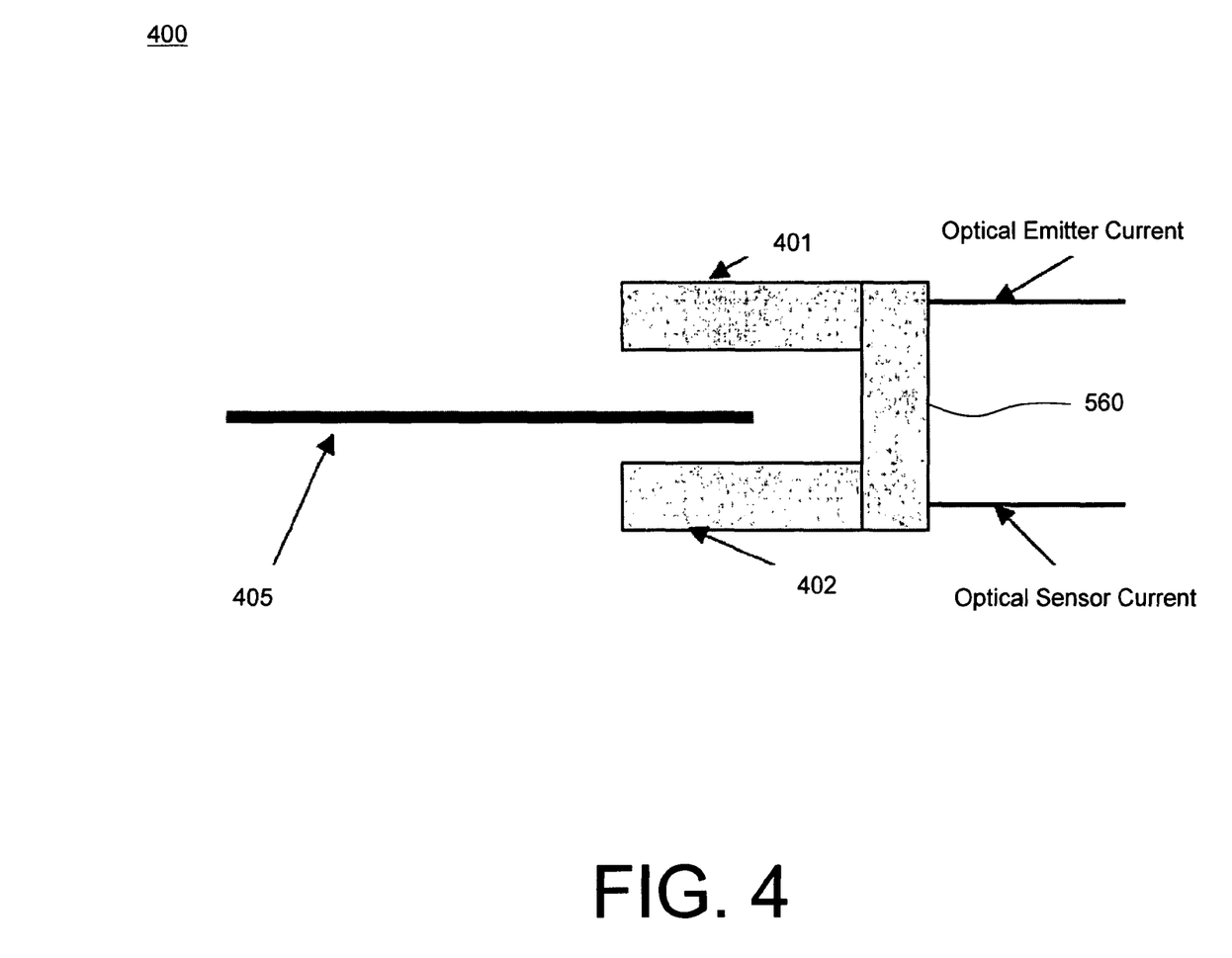
FIG. 4 illustrates electrical current paths in an optical encoder.

FIG. 4 illustrates electrical current paths in an optical encoder 400, comprising an optical unit 403 including an optical emitter 401 and an optical sensor 402, and a light controlling member (optical code scale) 405 disposed between the optical emitter 401 and the optical sensor 402.

Significantly, the inventors have determined that the electrical current drawn by optical sensor 402 decreases when the light path from optical emitter 401, to optical code scale 405, and then to optical sensor 402 is impeded or affected by contamination, such as one or more ink particles on optical code scale 405. Also significantly, the inventors have discovered that, in such a case, the malfunction or degradation in performance of the optical encoder can be ameliorated by increasing the current supplied to optical emitter 401.

Figure 5:
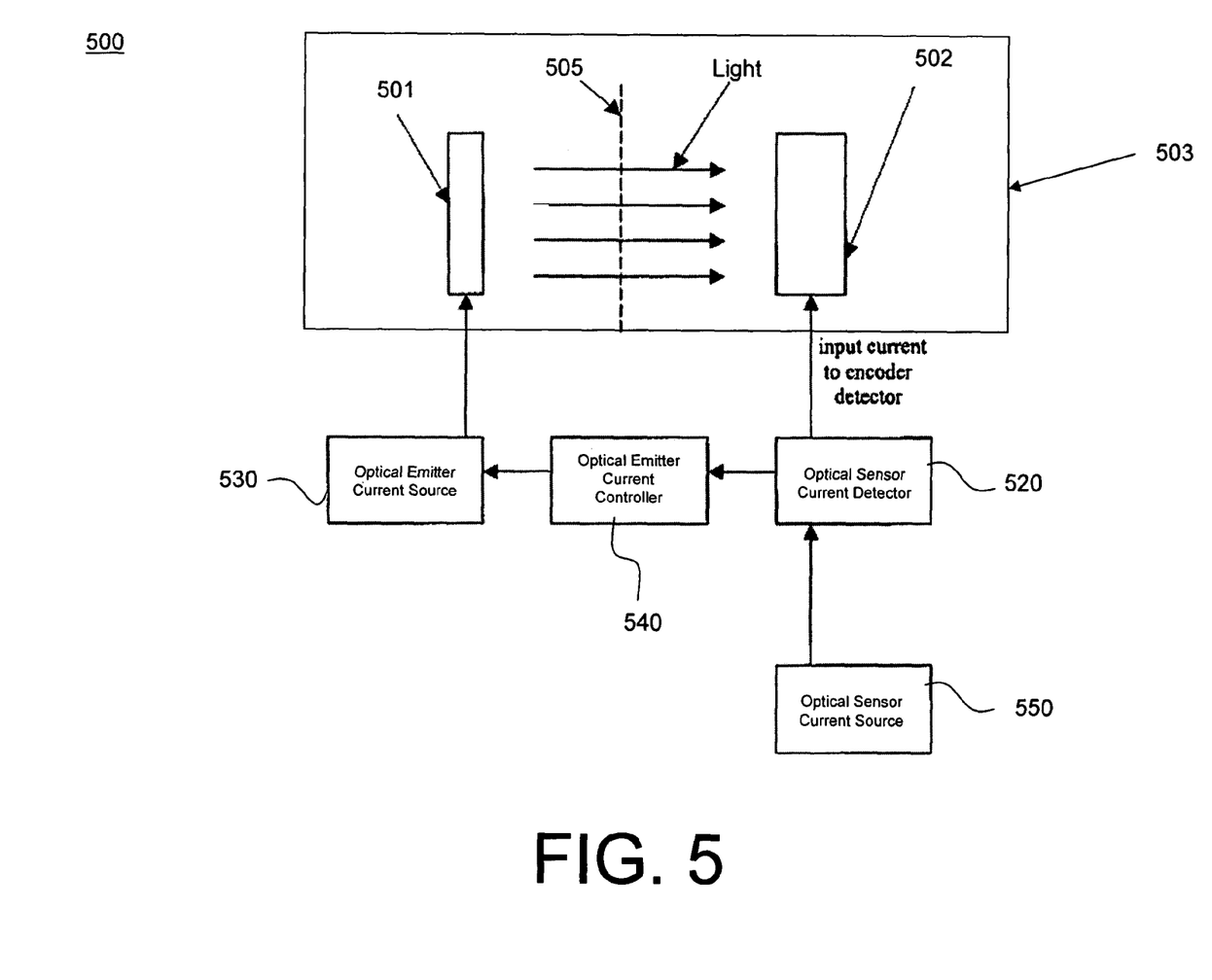
FIG. 5 is a block diagram of one embodiment of an optical encoder which can detect the presence of a contaminant.

According to these principles, FIG. 5 is a block diagram of one embodiment of an optical encoder 500 which can detect the presence of a contaminant (e.g., ink particle). Optical encoder 500 comprises an optical unit 503 including an optical emitter 501 and an optical sensor 502, and a light controlling member (optical code scale) 505 disposed between the optical emitter 501 and the optical sensor 502. Optical emitter 501 is a light source comprising, for example, one or more light emitting diodes. Meanwhile, in one embodiment optical sensor 502 comprises one or more photo-detectors, for example, photodiodes or charge coupled devices (CCDs). In one embodiment, optical emitter 501 is instituted in a first integrated circuit (IC) chip, and optical sensor 502 is instituted in a second integrated circuit (IC) chip.

Optical encoder 500 also includes an optical sensor current detector 520. Also present are optical emitter current source 530, optical emitter current controller 540, and optical sensor current source 550. One, all, or any combination of optical emitter current source 530, optical emitter current controller 540, and optical sensor current source 550 components may be integrated in the optical unit 503, such as being mounted on an optical unit housing 560 such as that shown in FIG. 4, or they may be provided separately. For example, optical emitter current source 530 and/or optical sensor current source 550 may be provided by a host device (e.g., a printer) into which optical encoder 500 is installed. In one embodiment, optical sensor current detector 520 and optical sensor 502 are instituted in a first integrated circuit (IC) chip, and optical emitter 501 and optical emitter current controller 540 are instituted in a second IC chip. Alternatively, optical sensor current detector 520, optical sensor 502, and optical emitter current controller 540 could also be instituted in a single IC chip.

Optical encoder 500 operates as follows. Optical emitter 501 provides light to optical code scale 505. As optical unit 503 moves along the length of optical code scale 505, light from optical emitter 501 passing through optical code scale 505 is sensed by optical sensor 502 to produce one or more signals that indicate the relative movement between optical unit 503 and optical code scale 505. The output signal or signals from optical sensor 502 are then used by the host device (e.g., a printer to help control the movement of the printing head and/or paper in the printing process).

When one or more contaminants (e.g., ink particle) is inadvertently deposited on optical emitter 501, optical code scale 505, and/or optical sensor 502 so as to impede or block light from optical emitter 501 from reaching optical sensor 502 (via optical code scale 505), then the optical sensor current drawn by optical sensor 502 will decrease. When the optical sensor current falls below a reference value, then optical sensor current detector 520 outputs an optical sensor current detector signal that indicates the presence of a contaminant (e.g., an ink particle) in the optical path from optical emitter 501, to code scale 505, and finally to optical sensor 502, that is negatively affecting operation of optical encoder 500.

Additionally, the optical sensor current detector signal is used to increase the optical emitter current supplied to optical emitter 501. In particular, the optical sensor current detector signal causes optical emitter current controller 540 to increase the current supplied from optical emitter current source 530 to optical emitter 501. In the embodiment shown in FIG. 4, optical emitter current controller 540 provides a signal to optical emitter current source 530 causing it to increase its output current. In an alternative embodiment, optical emitter current controller 540 may be disposed in the current path from optical emitter current source 530 to optical emitter 501, in which case it may directly increase the current provided to optical emitter 501.

When the optical emitter current provided to optical emitter 501 is increased, the intensity of light from optical emitter 501 is also increased, thereby counteracting and mitigating the negative effects of the contaminant(s) in the light path. In one embodiment, the optical emitter current is gradually increased in predetermined steps and the optical sensor current in repeatedly or continually compared to the reference value, such that the optical emitter current is no longer increased once the optical sensor current once again reaches the reference value. In another embodiment, optical sensor current detector 520 and/or optical emitter current controller 540 determine how much to increase the optical emitter current based on a measured value of the optical sensor current (e.g., smaller optical sensor current=greater increase in optical emitter current).

In a case where the contaminant(s) are deposited on the code scale 505, then light from optical emitter 501 is only impeded from reaching optical sensor 502 when optical sensor is sensing the part of code scale 505 where the contaminant is deposited. In that case, when optical sensor 502 moves away from the part of code scale 505 where the contaminant is deposited, the optical sensor current will again increase and optical sensor current detector 520 will see a ramp in the optical sensor current. This means that the amount of light provided by optical emitter 501 is now more than necessary, having been increased by the earlier regulation due to the presence of the contaminant. In that case, optical sensor current detector 520 will send a signal to optical emitter current controller 540 to reduce the optical emitter current supplied to optical emitter 501 until it restores the optical sensor current back to its reference values. Among other benefits, this helps prolong the life of optical emitter 501.

Also, in one embodiment, optical emitter current source 530 or optical emitter current controller 540 compares the optical emitter current to an optical emitter current alarm value that represents the maximum allowable optical emitter current. When the optical emitter current reaches the optical emitter current alarm value, then optical emitter current source 530 or optical emitter current controller 540 outputs an optical emitter current alarm signal. The optical emitter current alarm signal indicates that the malfunction due to one or more contaminants is so severe that it cannot be corrected by increasing the optical emitter current. This signal may be provided to the host device to indicate a malfunction of optical encoder 500 requiring maintenance or replacement.

Figure 6:
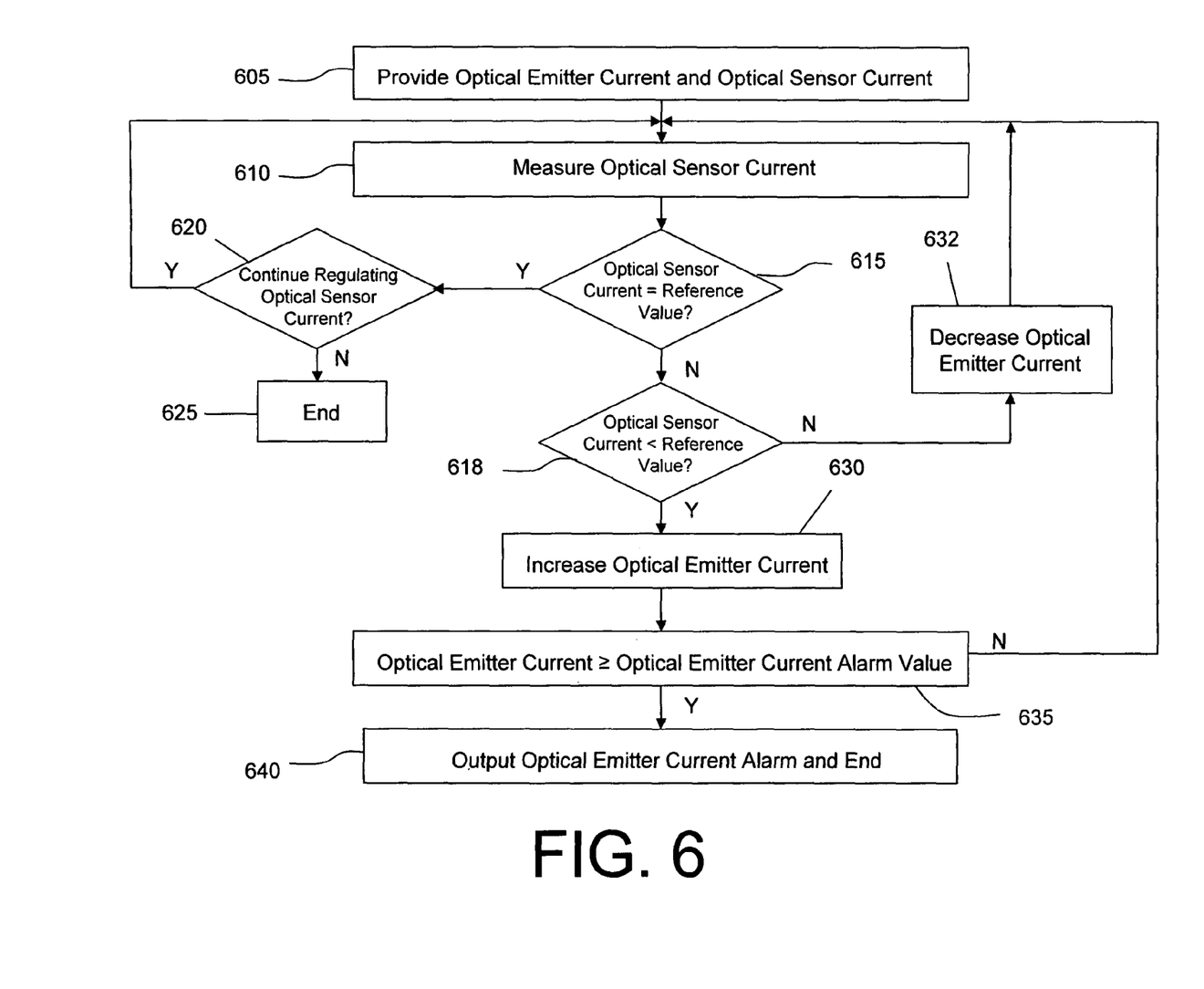
FIG. 6 is a flowchart illustrating one embodiment of a method of operating an optical encoder.

FIG. 6 is a flowchart illustrating one embodiment of a method of operating an optical encoder such as optical encoder 500.

In a first step 605, an optical emitter current is provided to an optical emitter, and an optical sensor current is provided to an optical sensor, of an optical encoder.

In a next step 610, the optical sensor current is measured.

Then, in step 615, the measured optical sensor current is compared to a predetermined reference value. The reference value may be determined empirically based on a smallest value of the optical sensor current that is drawn by the optical sensor 503 before a malfunction of the optical encoder 500 occurs due to one or more contaminants. However, other selection rules or procedures may be applied instead. It should be understood that step 610 can be eliminated by directly comparing the optical sensor current to the reference value with a comparator, without actually "measuring" an absolute value of the optical sensor current.

If the measured optical sensor current is equal to the reference value, then in a step 620 it is determined if the optical sensor current should no longer be regulated for some reason (e.g., the host device is in a standby state). If so, the process ends at step 625. Otherwise, the process returns to step 610 and repeats.

On the other hand, if it is determined in step 615 that the measured optical sensor current is not equal to the reference value, then in a step 618, it is determined if the measured optical sensor current is less than the reference value. If it is determined in step 618 that the measured optical sensor current is not less than the reference value, then it must be greater than the reference value. In that case, the process proceeds to step 632 where the optical emitter current will be decreased, and then back to step 610.

On the other hand, if it is determined in step 618 that the measured optical sensor current is less than the reference value, then the process proceeds to step 630 where the optical emitter current is increased. As explained above, in one embodiment, the optical emitter current is increased by a same, predetermined amount each time step 630 is executed. Alternatively, the amount by which the optical emitter current is increased may be determined based on the measured value of the optical sensor current.

Meanwhile, in a step 635 the optical emitter current is compared to an optical emitter current alarm value that represents the maximum allowable optical emitter current.

If the optical emitter current equals or exceeds the optical emitter current alarm value, then in a step 640, an optical emitter current alarm signal is output and the process ends. The optical emitter current alarm value may be determined empirically as an optical emitter current value for which optical emitter 501 maximizes, or nearly maximizes, its output light intensity. Alternatively, the optical emitter current alarm value may be selected based on maximum current rating value for optical emitter 501 based on safety, overheating, or an internal specification of the host device into which optical encoder 500 is installed. However, other selection rules or procedures may be applied instead.

Otherwise, if the optical emitter current is less than the optical emitter current alarm value, then the process the process returns to step 610 and repeats.

By the process 600, an optical sensor such as optical sensor 502 can determine when a contaminant is present in an optical or light path between its optical emitter and its optical sensor, and can increase the current supplied to the optical emitter so as to counteract and mitigate the negative affects of the contaminant. This in turn can lower the number of incidents when it becomes necessary to actually repair or replace the optical encoder, thus lowering operational costs.

It should be understood, of course, that in the reference values discussed above can be used as limits, or as the values just next to the limits, without departing from the scope of this invention. For example, in the embodiment of FIG. 6, if the optical emitter current equals or exceeds the optical emitter current alarm value, then the optical emitter current alarm signal is output. However, alternatively the optical emitter current alarm signal may be output only if the optical emitter current actually exceeds the optical emitter current alarm value. Similarly, in the embodiment of FIG. 6, the optical emitter current is increased if the measured optical sensor current is less than the reference value. However, alternatively the optical emitter current may be decreased if the measured optical sensor current is more than the reference value. Such equivalencies are well understood and deemed to be within the scope of the appended claims.

While example embodiments are disclosed herein, one of ordinary skill in the art appreciates that many variations that are in accordance with the present teachings are possible and remain within the scope of the appended claims. The embodiments therefore are not to be restricted except within the scope of the appended claims.

The invention claimed is:
1. An optical encoder, comprising:
an optical code scale; and
an optical unit, comprising,
an optical emitter receiving an optical emitter current and in response thereto providing light to the code scale;
an optical sensor receiving an optical sensor current and the light from the code scale and in response thereto outputting at least one signal indicating relative movement between the optical sensor and the code scale; and an optical sensor current detector comparing the optical sensor current to a reference value, and in response to the optical sensor current being different from the reference value, outputting an optical sensor current detector signal for regulating the optical emitter current supplied to the optical emitter.

2. The optical encoder of claim 1, further comprising an optical emitter current source supplying the optical emitter current to the optical emitter.

3. The optical encoder of claim 2, further comprising an optical emitter current controller receiving the optical sensor current detector signal from the optical sensor current detector and in response thereto regulating the optical emitter current supplied to the optical emitter.

4. The optical encoder of claim 3, wherein one of the optical emitter, current controller and the optical sensor current detector outputs an alarm signal when the optical emitter current is increased to an optical emitter current alarm value.

5. The optical encoder of claim 3, wherein the optical sensor, optical sensor current detector, and optical emitter current controller are all instituted in a single integrated circuit chip.

6. The optical encoder of claim 3, wherein the optical sensor and the optical sensor current detector are both instituted in a first integrated circuit chip, and the optical emitter and the optical emitter current controller are both instituted in a second integrated circuit chip.

7. The optical encoder of claim 1, wherein the optical sensor and the optical sensor current detector are both instituted in a single integrated circuit chip.

8. A method of operating an optical unit including an optical emitter and an optical sensor, the method comprising:
supplying an optical emitter current to the optical emitter;
supplying an optical sensor current to the optical sensor;
comparing the optical sensor current to a reference value; and
in response to the optical sensor current being different from the reference value, regulating the optical emitter current supplied to the optical emitter.

9. The method of claim 8, further comprising outputting an alarm signal when the optical emitter current is increased to an emitter current alarm value.

10. The method of claim 8, wherein the comparison is performed in real-time while the optical sensor outputs at least one signal indicating relative movement between the optical unit and a code scale.

11. An optical unit, comprising:
an optical emitter receiving an optical emitter current;
an optical sensor receiving an optical sensor current and light from the optical emitter and in response thereto outputting at least one signal indicating relative movement between the optical unit and an optical code scale; and
an optical sensor current detector comparing the optical sensor current to a reference value, and in response to the optical sensor current being different than the reference value, outputting an optical sensor current detector signal indicating the presence of a contaminant in a light path from the optical emitter to the optical sensor.

12. The optical unit of claim 11, further comprising an optical emitter current controller receiving the optical sensor current detector signal from the optical sensor current detector and in response thereto regulating the optical emitter current supplied to the optical emitter.

13. The optical unit of claim 12, wherein one of the optical emitter current controller and the optical sensor current detector outputs an optical emitter current alarm signal when the optical emitter current is increased to an optical emitter current alarm value.

14. The optical unit of claim 12, wherein the optical sensor, optical sensor current detector, and optical emitter current controller are all instituted in a single integrated circuit chip.

15. The optical unit of claim 12, wherein the optical sensor and the optical sensor current detector are both instituted in a first integrated circuit chip, and the optical emitter and the optical emitter current controller are both instituted in a second integrated circuit chip.

16. The optical unit of claim 12, wherein the optical sensor, the optical sensor current detector, the optical emitter, and the optical emitter current controller are all mounted on a same optical unit housing.

17. The optical unit of claim 11, further comprising an optical emitter current source supplying the optical emitter current to the optical emitter.

18. The optical unit of claim 11, further comprising an optical sensor current source supplying the optical sensor current to the optical sensor.

19. The optical unit of claim 11, wherein the optical sensor and the optical sensor current detector are both instituted in a single integrated circuit chip.

20. The optical unit of claim 11, wherein the optical emitter, the optical sensor, and the optical sensor current detector are all mounted on a same optical unit housing.

* * * * *